Dec. 30, 1930.　　O. C. TRAVER　　1,787,181
PROTECTIVE ARRANGEMENT
Filed Jan. 2, 1929
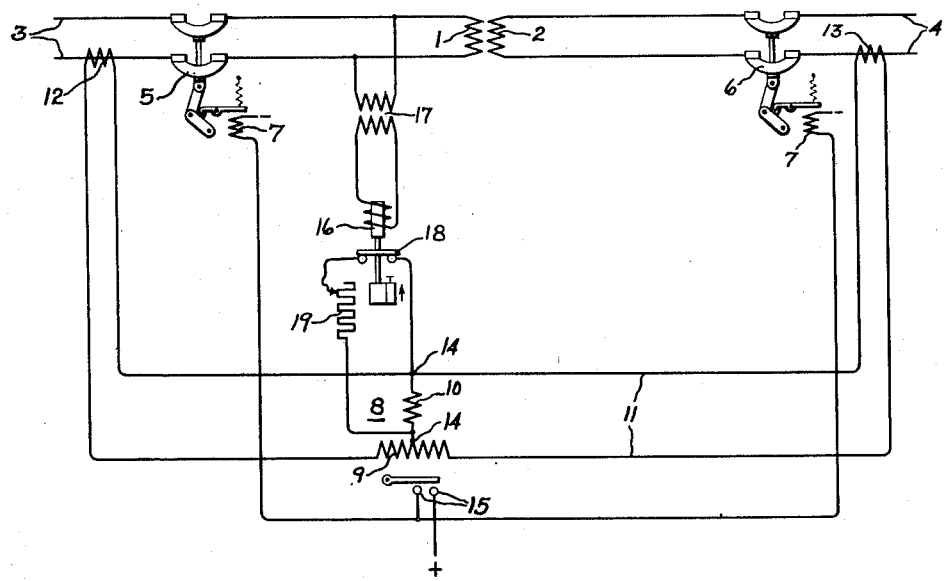
Inventor:
Oliver C. Traver
by Charles E. Mullan
His Attorney Patented Dec. 30, 1930

1,787,181

UNITED STATES PATENT OFFICE

OLIVER C. TRAVER, OF PENNFIELD, UPPER DARBY, PENNSYLVANIA, ASSIGNOR TO GENERAL ELECTRIC COMPANY, A CORPORATION OF NEW YORK

PROTECTIVE ARRANGEMENT

Application filed January 2, 1929. Serial No. 329,845.

My invention relates to improvements in protective arrangements for electric systems and more particularly balanced protective arrangements for electric apparatus subject to magnetizing inrush currents and an object of my invention is to provide an improved protective arrangement whereby to avoid false circuit interruption because of such currents.

Electric apparatus must be provided with sensitive protection against internal faults so as to announce them, if possible, before they become serious. If the apparatus is subject to magnetizing inrush currents, as in the case of power transformers, and a balanced type of protection is used, the sensitivity must be sacrificed to more or less extent in order to avoid unnecessary circuit interruption when the magnetizing current surge occurs as for example when placing the apparatus in service. Various expedients such as the so-called "kick" fuses and manually operated controls have been used for this purpose. The former require replacement and like the latter are not wholly reliable. In accordance with my invention, I provide an arrangement which avoids these undesirable features and yet provides maximum sensitivity without unnecessary circuit interruption.

My invention will be better understood from the following description when considered in connection with the accompanying drawing and its scope will be pointed out in the appended claims.

The single figure of the drawing illustrates an embodiment of my invention as applied to electromagnetic apparatus, shown, for simplicity as a single-phase power transformer having windings 1 and 2. These are arranged to be connected in a system including circuits 3 and 4 by suitable circuit interrupting means herein shown as latched closed circuit breakers 5 and 6 each having a trip coil 7.

In order to protect the transformer against faults, there is provided fault responsive protective means including a relay 8 having two cooperating windings 9 and 10 which are respectively connected to be energized in accordance with the sum of and the difference between the currents into one winding of the transformer and out of the other. For this purpose the relay winding 9 may be connected in series in a protective circuit 11 including two current transformers 12 and 13 which are connected normally to circulate current. The winding 10 is connected across normally equal potential points 14 of this circulating current circuit. The relay 8 is of the differential type in which the operating winding 10 is opposed by the restraining winding 9, the action being such that the relay is operative to close its contacts 15 in the circuit of the trip coils 7 only when the ratio of the currents in the circuits 3 and 4, that is the input and output currents of the power transformer, has a predetermined value. The relay 8 may be of the induction disk or balanced arm plunger type, examples of both of which are known to the art.

In accordance with my invention, I provide means responsive to the energization of the power transformer for decreasing the sensitivity of the relay 8 until the subsidence of the magnetizing current inrush transient. This means may be arranged to be energized whenever the power transformer is excited and as shown includes a voltage responsive device such as a relay 16 which is arranged temporarily to decrease the effectiveness of one of the windings of the relay 8 when the circuit breaker 5 is closed to effect the excitation of the power transformer. The relay 16 may be connected in circuit with the winding 1 of the power transformer through any suitable means such as a potential transformer 17.

In order to control the effectiveness of the relay 8, the relay 16 is arranged to control or proportion the difference current that passes through the operating winding 10. For this purpose, the relay 16 may be arranged through its contact controlling member 18 to control a bypass circuit including an impedance device such as a resistance 19 which is connected in parallel with the operating winding 10 when the winding 1 of the power transformer is deenergized so as to determine the proportion of the total difference current which passes through the operating winding 10. For varying this proportion, the resistance 19 may, of course, be made adjustable as shown.

Upon the closing of the circuit breaker 5 to effect the excitation of the winding 1 of the power transformer, the relay 16 is energized, but opens the circuit of the parallel resistor 19 through its contact controlling member 18 only after a time delay sufficient to allow for stable circuit conditions following the magnetizing inrush current. At the expiration of the time delay of the relay 16, the resistance 19 is open circuited and so maintained while the power transformer remains excited. The sensitivity of the relay 8 which was reduced prior to the operation of the relay 16 is now restored to that degree which is desirable for protection of the transformer under stable operating conditions and so maintained until deenergization of the relay 16 which then closes the circuit of the resistance 19 substantially instantaneously.

While I have shown and described my invention in considerable detail, I do not desire to be limited to the exact arrangement shown, but seek to cover in the appended claims all those modifications which fall within the true spirit and scope of my invention.

What I claim as new and desire to secure by Letters Patent of the United States, is:

1. In combination with electromagnetic apparatus subject to magnetizing inrush currents, fault responsive protective means including a relay having two cooperating windings respectively connected to be energized in accordance with the sum of and the difference between the currents into and from said apparatus and means responsive to the energization of said apparatus for decreasing the sensitivity of the relay until the subsidence of the magnetizing inrush current transient.

2. In combination with electromagnetic apparatus subject to magnetizing inrush currents, fault responsive protective means including a relay having two cooperating windings respectively connected to be energized in accordance with the sum of and the difference between the currents into and from said apparatus and means connected to be energized upon the energization of said apparatus for temporarily decreasing the effectiveness of one of said windings.

3. In combination with electromagnetic apparatus subject to magnetizing inrush currents, fault responsive protective means including a relay having restraining and operating windings respectively connected to be energized in accordance with the sum of and the difference between the currents into and from said apparatus and means connected to be energized upon the energization of said apparatus for temporarily decreasing the effectiveness of said operating winding.

4. In combination with a transformer, fault responsive protective means therefor including a relay having restraining and operating windings respectively connected to be energized in accordance with the sum of and the difference between the currents fed to and supplied by said transformer, a voltage responsive device connected to be energized upon the energization of a winding of said transformer and means controlled by said voltage responsive device for temporarily decreasing the effectiveness of said operating winding upon the energization of said transformer winding.

5. In combination with a transformer, fault responsive protective means therefor including a relay having restraining and operating windings respectively connected to be energized in accordance with the sum of and the difference between the currents fed to and supplied by said transformer and means for temporarily decreasing the effectiveness of said operating winding including a time delay circuit opening relay connected to be energized upon the energization of said transformer, said relay being arranged when deenergized to complete a circuit for by-passing a predetermined proportion of the current in said operating winding.

In witness whereof, I have hereunto set my hand this 29th day of December, 1928.

OLIVER C. TRAVER.